May 12, 1953   E. H. McLAUGHLIN   2,638,084
METHOD AND APPARATUS FOR DRILLING GLASS SHEETS
Filed Dec. 29, 1951   3 Sheets-Sheet 1
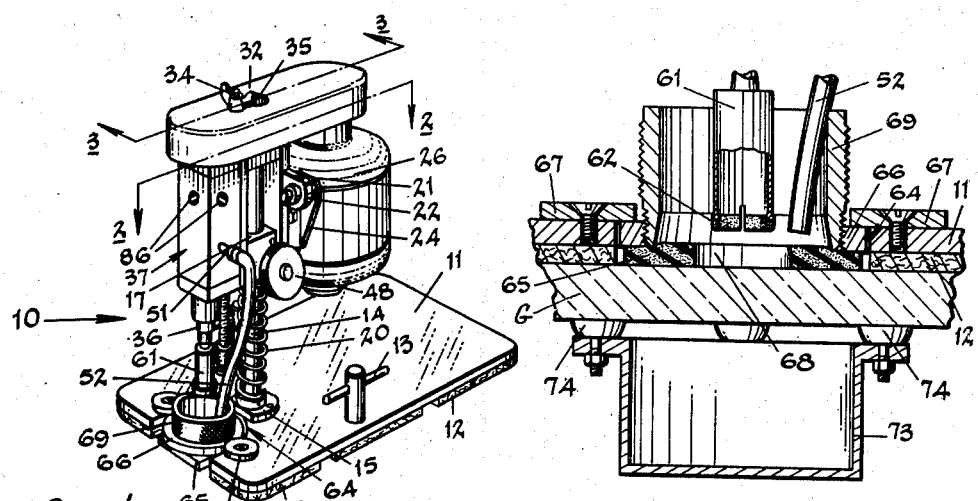
Fig. 1
Fig. 8
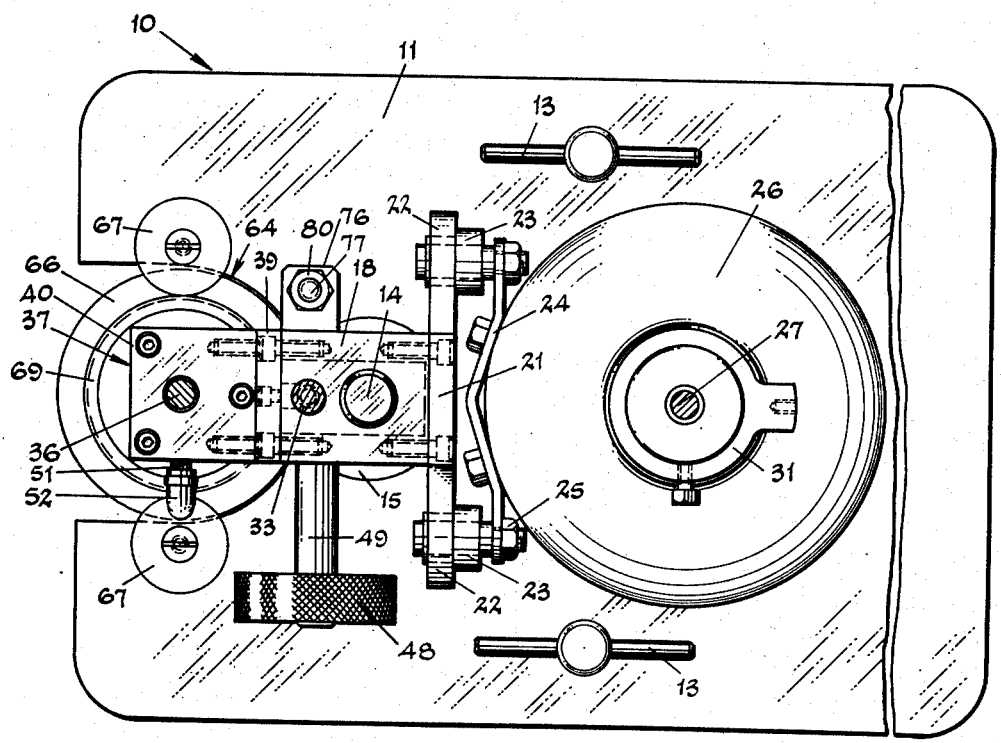
Fig. 2
Inventor
Eli H. McLaughlin
By Nobbe & Swope
Attorneys May 12, 1953  E. H. McLAUGHLIN  2,638,084
METHOD AND APPARATUS FOR DRILLING GLASS SHEETS
Filed Dec. 29, 1951  3 Sheets-Sheet 2

Inventor
Eli H. McLaughlin
By Nobbe & Swope
Attorneys

May 12, 1953 E. H. McLAUGHLIN 2,638,084
METHOD AND APPARATUS FOR DRILLING GLASS SHEETS
Filed Dec. 29, 1951 3 Sheets-Sheet 3

Inventor
Eli H. McLaughlin
Nobbe & Swope
Attorneys

Patented May 12, 1953

2,638,084

UNITED STATES PATENT OFFICE 2,638,084

METHOD AND APPARATUS FOR DRILLING GLASS SHEETS

Eli H. McLaughlin, Toledo, Ohio

Application December 29, 1951, Serial No. 264,077

5 Claims. (Cl. 125—20)

This invention relates to an improved method and apparatus for drilling holes in glass sheets, although it is to be understood that it can also be employed in the drilling of sheets or plates of other materials.

It is well known that in using diamond impregnated cutting edges common to the glass drilling art, best results are obtained when a liquid coolant is fed to the interior of a hollow, tube-like drill tool and thence to the cutting edge as said edge rotates in contact with the glass sheet. In such an operation, there must be a continuous supply of the coolant fed to the tool since it is ordinarily thrown outwardly from the cutting edges by virtue of the centrifugal action of the rotating tool.

It is the primary object of this invention to provide a drilling apparatus for glass sheets which is self-contained and portable.

It is a further object of this invention to provide a portable drilling apparatus for glass sheets with built-in or self-contained pumping means, such that a coolant can be recirculated through a hollow drill tool in said apparatus, thereby obviating the necessity of continuously supplying a coolant from an outside source.

It is a still further object of this invention to provide an adjusting device for a portable drilling apparatus to enable an operator to drill through a glass sheet entirely from one side and yet not shatter or fracture the opposite side thereof.

Other objects and advantages of this invention will become more apparent during the course of the following description when taken in connection with the accompanying drawings.

In the drawings, wherein like numerals are employed to designate like parts throughout the same:

Fig. 1 is a perspective view of the apparatus constructed in accordance with this invention;

Fig. 2 is a sectional plan view of the apparatus taken substantially on broken line 2—2 of Fig. 1;

Fig. 8 is an enlarged sectional front view of the coolant cup assembly; and

Referring now in particular to the drawings, there is illustrated in Fig. 1 a form of the portable drill press apparatus embodied in this invention and designated generally as 10. Providing a support for the apparatus is a substantially rectangular base plate 11, which is adapted to rest on the surface of the glass sheet to be drilled by means of felt pads 12. Handles 13 are conveniently located on the upper surface of the base plate for moving the entire apparatus from one position to another.

Figure 5:
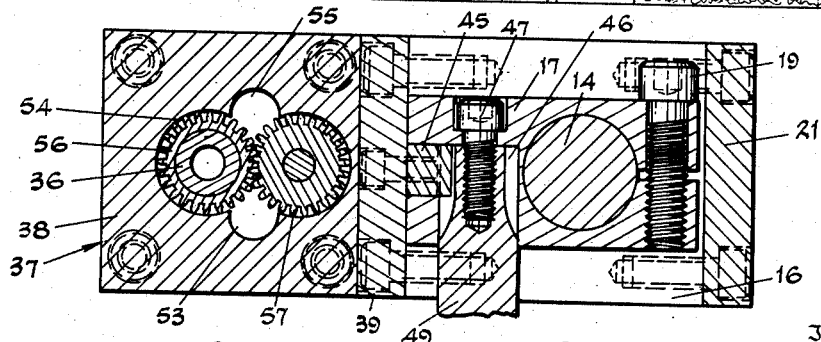
Fig. 5 is an enlarged sectional view of the drill spindle assembly and pinion gear housing taken substantially on broken line 5—5 of Fig. 3.

A bearing column 14 is secured to and upstands from said base plate by means of a collar 15. The column extends through a lower frame member 16, a pinion gear housing 17 and an upper frame member 18. The column thus provides a guiding surface for the vertical movement of said frame members relative thereto, while the pinion gear housing is attached to said column by means of bolt 19, as shown in Fig. 5, in such a manner that a slight turning of said bolt will release said housing from its attachment to said column. Lower frame member 16 is yieldably supported on said column by helical coil spring 20 between collar 15 and said lower frame. A back frame member 21 is secured to the upper and lower frames and has outwardly extending ears 22 (Fig. 2) for the reception of motor adjusting rods and guide bushings 23. A motor support plate 24 is detachably secured to the opposite ends of said rods by means of nuts 25. As best shown in Fig. 2, said plate is V-shaped in cross section and receives a motor 26 which is bolted thereto. Thus, it can be seen that the motor is supported in a manner such that it can be readily removed from its support.

Figure 3:
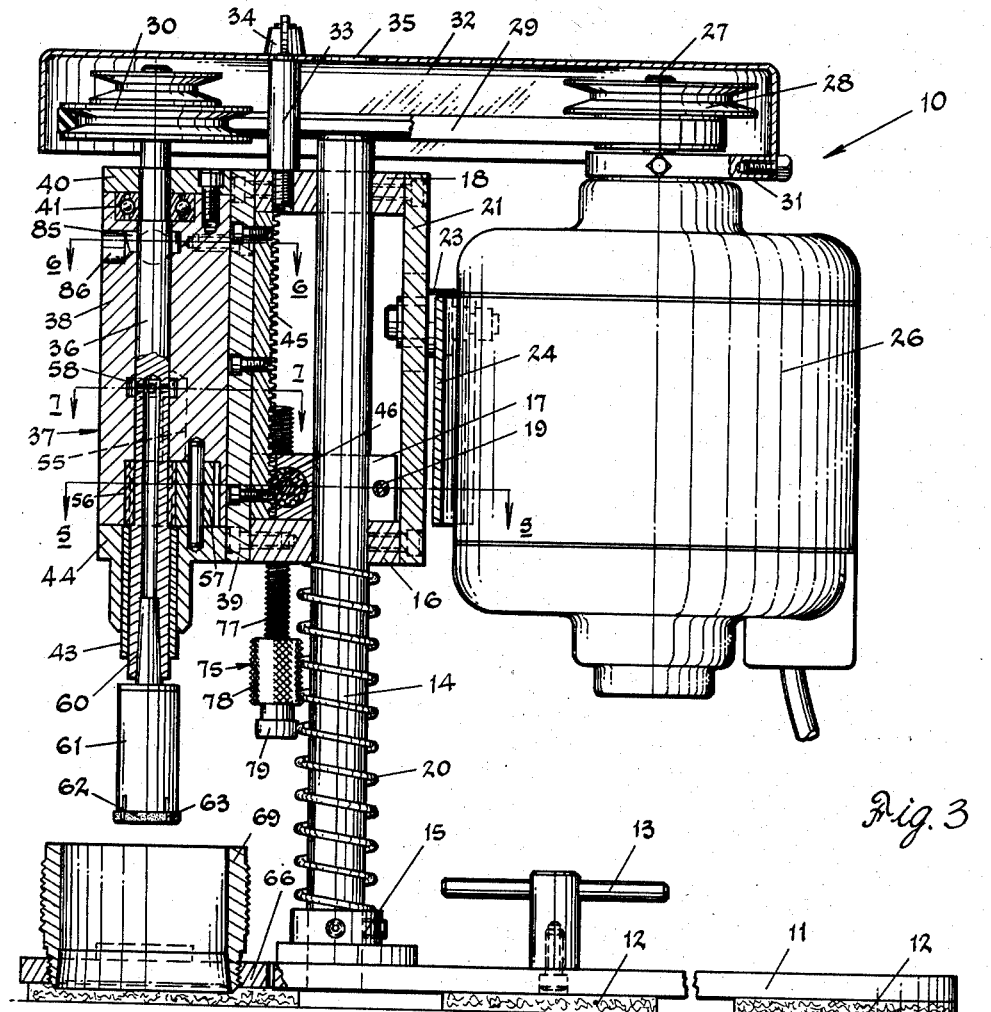
Fig. 3 is a side view of the apparatus, with parts broken away, taken substantially on broken line 3—3 of Fig. 1.

Extending vertically from motor 26 is a drive shaft 27 to which are keyed a plurality of pulley wheels 28 of a variable speed pulley unit. Trained over one of said pulley wheels is a flexible power-transmitting belt 29 by which another set of pulley wheels 30 of said unit are driven. A collar 31 surrounds an upwardly extending shoulder on motor 26 and is removably attached thereto by a set screw, as shown in Figs. 2 and 3. A belt guard housing 32 is rigidly secured at one end to a portion of said collar and extends over the belt and pulley unit in a manner shown in Fig. 3.

At a point longitudinally and toward the opposite end of said housing is a recess through which a pin 33 extends. A wing nut 34 is threaded onto the upper end of said pin and against the upper surface of the housing, and the lower end of the pin is threadedly received in upper frame member 18, such that the housing is removably secured to the frame as well as to motor 26. Belt guard housing 32 is also recessed at 35 to allow the passage of bearing column 14 therethrough in a manner to be explained subsequently.

Keyed to pulley wheels 30 and driven thereby is a downwardly extending spindle 36 which is journaled in a spindle housing, designated generally as 37. An oblong middle member 38 of said spindle housing is rigidly secured at its back side to a front frame member 39 which in turn is rigidly secured to upper and lower frame members 18 and 16. Other portions of the housing include a flat top plate 40 bolted to middle member 38, ball bearings 41 disposed below said plate and in a recessed annular portion 42 at the top of member 38, and a bushing 43 received in a flat bottom plate 44 and its downwardly extending neck.

Thus, it can now be seen that spindle 36 is rotated by the above described power-transmitting mechanism relatively to spindle housing 37 and the frame members. Also, said spindle, along with its housing, the frame members, and the said power-transmitting mechanism, can be moved vertically with respect to bearing column 14 by means of a toothed rack 45, secured to front frame 39 and extending vertically between the upper and lower frame members, and a meshing pinion gear 46 rotatably secured with respect to pinion gear housing 17 as at 47. As best shown in Fig. 5, inasmuch as pinion gear housing 17 is secured to column 14 by bolt 19 so as to be movable vertically therewith and pinion gear 46 is held in meshing engagement with rack 45 by means of bolt 47, a turning of said pinion gear on said rack will cause spindle 36, as well as upper and lower frame members and recess 35, to move vertically in sliding over column 14. Further, bolt 47 prevents the pinion gear 46 and rack 45, as well as the frame members, the spindle housing and the power-transmitting mechanism from turning in a horizontal plane. On the other hand, the entire apparatus, including the pinion gear and its housing, may be moved vertically to any desired extent and more rapidly by merely loosening bolt 19. A knurled hand wheel 48 is attached to an extension 49 on said pinion gear and provides means for manual manipulation of the same and thereby moving the spindle 36 in a vertical direction.

Figure 4:
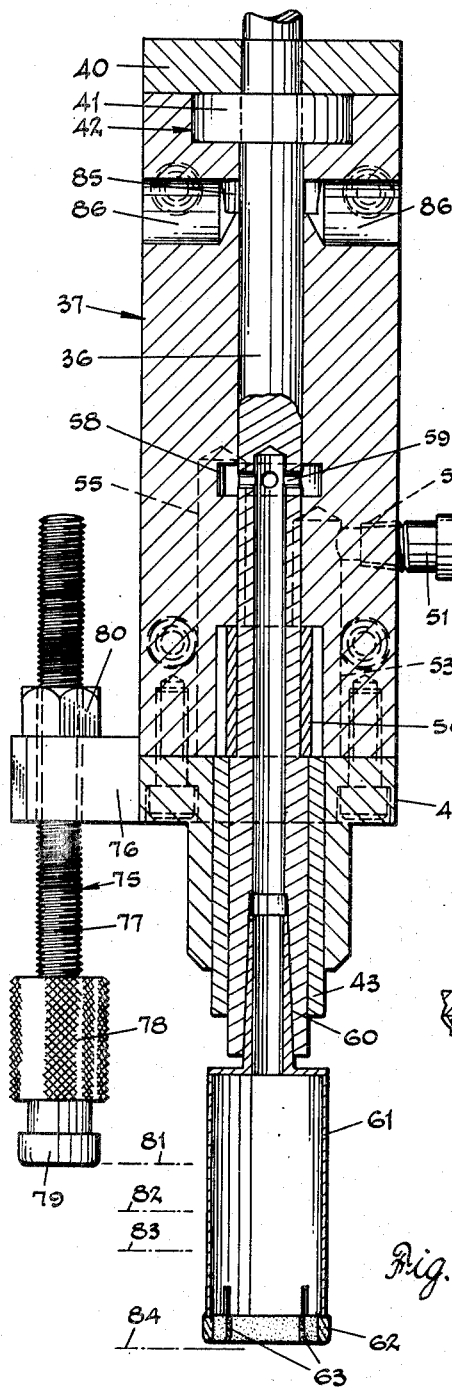
Fig. 4 is an enlarged sectional front view of the drill spindle assembly taken along the center of the spindle.
Figure 7:
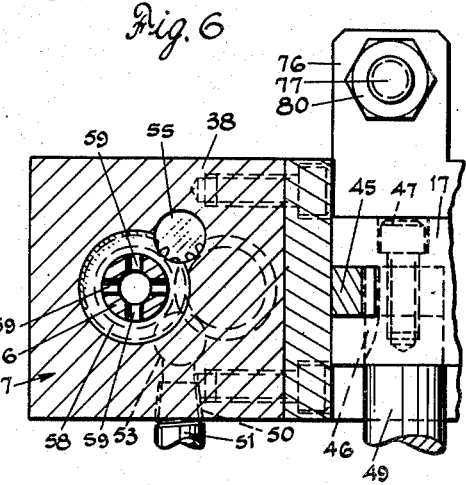
Fig. 7 is an enlarged sectional view of the drill spindle assembly taken substantially on broken line 7—7 of Fig. 3.

In the side of middle member 38 of spindle housing 37 is an intake opening 50 which is threaded so as to receive a nozzle 51 to which is connected a flexible hose 52. Opening 50 communicates with a downwardly extending intake passage 53 in said middle member, as best shown in Fig. 4. The interior of the lower end of said middle member is recessed at 54 to provide communication between the lower end of said intake passage and the lower end of an outlet passage 55 by means of a driving gear 56 and driven gear 57 disposed in opposite sides of said recess (see Fig. 5). As best shown in Fig. 3 driving gear 56 is keyed to and driven by spindle 36, and driven gear 57 meshes with said driving gear and turns on a spindle journaled in said middle member. Thus, it can be seen that a coolant supply to intake opening 50 and passage 53 will be fed to outlet passage 55 by means of gears 56 and 57 upon the rotation of spindle 36. That is, as the gears 56 and 57 rotate in recess 54, coolant will be trapped or pocketed between the teeth of said gears and the outer walls of said recess and thus be continuously fed from intake passage 53 to outlet passage 55. As best shown in Figs. 4 and 7, the outlet passage extends upwardly from recess 54 beyond the upper end of the intake passage and communicates at its upper end with an annular recess 58 in said middle member and surrounding spindle 36.

The lower portion of the spindle is hollow and, at the upper end of its hollowed portion, has a plurality of radially extending apertures 59 communicating with annular recess 58 such that the coolant, upon being fed to outlet passage 55, will pass into said annular recess and into the hollow portion of spindle 36 during its rotation. The lower end of said spindle's hollow portion is tapered interiorly as at 60 to frictionally receive a correspondingly exteriorly tapered hollow neck of a tube-like drilling tool or bit 61. Secured to the lower end of said drilling tool is a common form of diamond impregnated cutting edge or crown 62. Both the crown and the lower end of the tool to which it is secured are slotted as at 63 for a purpose to be subsequently explained. Thus, the coolant will pass from the hollow portion of the spindle through tool 61 into communication with the cutting edge or crown 62 and outwardly therefrom through slots 63 as the tool is lowered onto the sheet to be drilled.

In axial alignment with said spindle and tool is a substantially semi-circular recess 64 in the forward end of base plate 11. Loosely received in said recess is a correspondingly shaped mat 65 of sponge rubber or other resilient sealing material, on top of which is a ring-like member 66 which is threaded interiorly as shown in Fig. 8. Mat 65 and ring 66 are held within said recess when disposed over a sheet of glass G by means of retaining discs 67 on base plate 11. Mat 65 is apertured at 68 so that when it is so held, tool 61 is in axial alignment therewith for passage therethrough upon downwardly movement. Threadedly received in ring 66 is a cylindrical coolant cup 69 the outer portion of which is knurled to facilitate insertion thereof into said ring. The lower end of the cup is tapered as shown in Fig. 8 so as to present a sharp edge to mat 65 and thus seal in water-tight relation the lower end of the cup when it is inserted into ring 66. It can be seen in said figure that hose 52 extends downwardly from nozzle 51 into the coolant cup.

Figure 9:
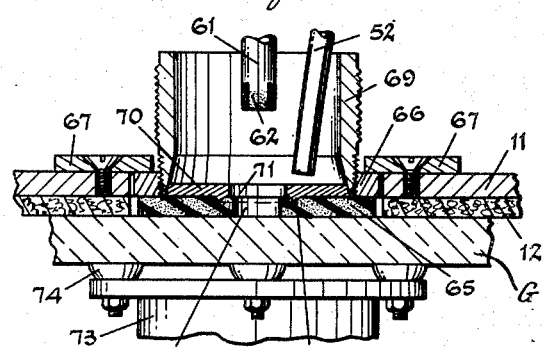
Fig. 9 is an enlarged sectional front view of an alternative form of coolant cup assembly.

For use with tools of smaller diameter, there is shown in Fig. 9 an alternative form of coolant cup assembly. In this instance, the mat 65 has an aperture 68 of smaller diameter and in addition thereto a ring-like adapter plate 70. As shown, the adapter plate is frictionally received in the tapered end of coolant cup 69 and over said mat. An aperture 71 through said adapter plate is in axial alignment with aperture 68 and is surrounded by an annular ridge 72 which bites into the mat and, as in the other form, thus provides a water-tight seal for cup 69 when said cup is inserted into ring 66. Thus, it can be seen that a number of differently sized tools may be used in connection with this apparatus.

In the light of the foregoing description, the improved cooling operation of this apparatus can be described in the following manner. That is, upon being placed in the desired position over the glass sheet G, water-tight cup 69 is filled with coolant and hose 52 is placed in said cup below the level of the coolant. As the spindle and tool are rotated and simultaneously lowered into the cup and onto the sheet to be drilled, the coolant is forced by the centrifugal action of said tool through slots 63 into hose 52 and intake passage 53. From the intake passage the coolant is fed by gears 56 and 57 into outlet passage 55, and from there it is drawn into and through the hollow spindle and tool by the low pressure area created therein by the rotating tool. Thus, there is provided in this apparatus a self-contained and continuously recirculating cooling system.

Beneath and surrounding the part of the glass sheet to be drilled is a cylindrical waste cup 73 which can be removably attached to said sheet by means of suction cups 74 on an annular flange of said cup. The purpose of the cup, of course, is to catch the coolant and drilled glass portion as the tool passes therethrough.

In Fig. 4 there is illustrated an adjusting device, designated generally as 75, for indicating to the operator of hand wheel 43 that the crown of tool 61 has reached a certain depth in its drilling operation with respect to the bottom of the glass sheet. Extending outwardly from lower frame member 16 is a flange 76 which threadedly receives an adjusting screw 77. On the lower portion of said screw is a knurled handle 78 and at the bottom, a flat abutment 79. On the upper end of the screw is a nut 80 by which said screw can be locked in place.

To the side of tool 61 in Fig. 4 are a number of broken lines 81–84, inclusive, by which the method for using this device is illustrated. The distance between the lines 81 and 82 represents the thickness of base plate 11, lines 82 and 83 the thickness of felt pads 12, and between lines 83 and 84 the thickness of the sheet to be drilled. Thus, with the device positioned as illustrated, the distance from line 84 to the bottom of crown 62 on the tool represents the distance between the bottom of said crown and the underside of the sheet when abutment 79 comes to rest on the top side of the base plate 11. In other words, it represents the "clearance" which the operator has chosen in order to avoid drilling all the way through the sheet entirely from one side thereof at the same speed at which the tool descended through the drilled portion of said sheet. Therefore, all that is necessary in using this device is to determine the thicknesses of the base plate, felt pads and sheet of glass and to subtract from the total thereof the desired "clearance." The abutment is then elevated above the top surface of the base plate a distance equal to the difference and the adjusting screw is locked in place by nut 80. When the abutment comes to rest on the top surface of the base plate and it is only necessary to drill the thickness of the "clearance," the nut is loosened and the adjusting screw raised such that the tool can be lowered slowly through the "clearance." In this way, it has been found that the underside of the sheet surrounding the drilled out portion will not shatter or fracture.

Figure 6:
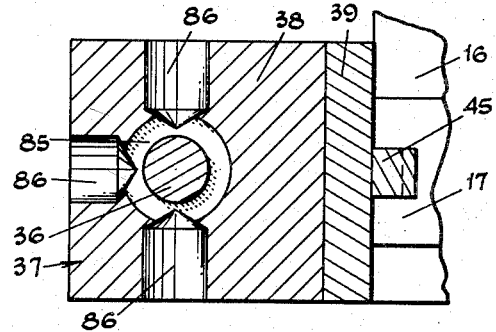
Fig. 6 is an enlarged sectional view of the drill spindle assembly taken substantially on broken line 6—6 of Fig. 3.

As best shown in Fig. 6 there is an annular recess 85 in spindle housing 37 and surrounding spindle 36 at a point below ball bearings 41 and above recess 58. A plurality of drip holes 86 extend outwardly from said recess and provide communication with the outside of said housing for disposing of coolant which may accumulate between said spindle and housing above recess 58.

Dealing now with the drill press apparatus 10 in its entirety, the advantages to be gained are apparent. The apparatus is carried by means of handles 13 to any desired location and placed over the glass sheet which is to be drilled in such a manner that the portion thereof to be drilled is beneath tool 61 and is unsupported. The tool is accurately positioned over the portion to be drilled by centering mat 65 thereover. The tool is then lowered into the coolant cup 69 in close proximity to the upper surface of the sheet and the adjusting device 75 is set for the desired "clearance" in the manner previously described. Coolant is then placed in the cup along with hose 52, and the motor is operated to rotate the tool. As the tool is rotating and the coolant is being recirculated in a manner that has been described in detail, the tool is manually lowered by means of hand wheel 48. The cutting action occurs, of course, as the cutting edge or crown 62 contacts the sheet and is affected by the grinding action of the diamond particles embedded in said edge. When the cutting edge reaches the "clearance" point, abutment 79 rests on the base plate 11 and the cutting edge is prevented from cutting further into the sheet. As described, the cutting edge thereafter is descended through the remaining thickness or "clearance" of the glass sheet.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. An apparatus adapted to be supported on a glass sheet or the like for drilling holes therein comprising, a coolant container over said sheet, a housing disposed above said container, a hollow, rotary drill spindle journaled in said housing, a tube-like drill tool attached to and communicating with said spindle, a conduit between said container and an opening in said housing, means internally of said housing for delivering a coolant from said opening to said drill tool, and means for lowering said tube-like drill tool into said container and onto said sheet.

2. An apparatus of the character defined in claim 1, in which said coolant delivering means comprises passages connecting said opening to said hollow drill spindle and feed gears driven by said rotary spindle and disposed between said passages.

3. An apparatus adapted to be supported on a glass sheet or the like for drilling holes therein comprising, a coolant container over said sheet, a housing disposed above said container, a hollow, rotary drill spindle journaled in said housing, a tube-like drill tool attached to and communicating with said spindle, a ring-like cutting edge on the lower end of said tool, downwardly extending slots through said cutting edge and the lower end of said tool, a conduit between said container and an opening in said housing, means internally of said housing for delivering a coolant from said opening to said drill tool, and means for lowering said tube-like drill tool into said container and said cutting edge onto said sheet.

4. An apparatus adapted to be supported on a glass sheet or the like for drilling holes therein comprising, a downwardly extending hollow drill spindle journaled in a housing above said sheet, a tube-like drill tool depending from and communicating with said hollow drill spindle, slots through a ring-like cutting edge on said tool, a coolant container below said tool and above said sheet, a conduit connecting said container and an opening in said housing, passages internally of said housing providing communication between said opening and said hollow drill spindle, means in said housing and operatively connected with said spindle for feeding coolant through said passages, and means for simultaneously rotating and lowering said tool into said coolant container and said edge onto said sheet.

5. An apparatus adapted to be supported on a glass sheet or the like for drilling holes therein comprising, a housing elevated from said sheet, a hollow spindle journaled in said housing, a hollow drill tool operatively connected to and movable with said spindle, a cutting edge on the lower end of said tool, downwardly extending slots through said cutting edge and the lower end of the tool, a coolant cup below said tool and over said sheet, a hose connecting said coolant cup and an intake opening in said housing, passages internally of said housing operatively connecting said intake opening to said cutting edge, means for lowering said tool and edge into said coolant cup and onto the glass sheet, and means for simultaneously rotating said tool and edge whereby a coolant will be expelled outwardly from the interior thereof through the slots therein and drawn into said passages through said hose.

ELI H. McLAUGHLIN.

References Cited in the file of this patent

UNITED STATES PATENTS

| Number | Name | Date |
|---|---|---|
| Re. 16,043 | Joseph | Apr. 14, 1925 |
| 220,384 | Jones | Oct. 7, 1879 |
| 385,666 | Hadley | July 3, 1888 |
| 1,219,461 | Johnston | Mar. 20, 1917 |
| 1,385,732 | Taylor | July 26, 1921 |
| 1,927,865 | Aldeen | Sept. 26, 1933 |
| 2,151,205 | Hawn | Mar. 21, 1939 |
| 2,413,084 | Sommer et al. | Dec. 24, 1946 |
| 2,478,846 | Smith | Aug. 9, 1949 |
| 2,569,854 | Hatcher | Oct. 2, 1951 |